US007103882B2

(12) United States Patent
Kawahito

(10) Patent No.: US 7,103,882 B2
(45) Date of Patent: Sep. 5, 2006

(54) OPTIMIZATION APPARATUS, COMPLIER PROGRAM, OPTIMIZATION METHOD AND RECORDING MEDIUM

(75) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/446,841

(22) Filed: May 29, 2003

(65) Prior Publication Data

US 2004/0019770 A1    Jan. 29, 2004

(30) Foreign Application Priority Data

Jul. 29, 2002   (JP)   ............... 2002-219853

(51) Int. Cl.
*G06F 9/45* (2006.01)
*G06F 15/00* (2006.01)

(52) U.S. Cl. ............. 717/151; 717/154; 717/155; 717/159; 717/161; 712/233; 712/234

(58) Field of Classification Search ............. 717/137, 717/141, 153, 157, 151, 159, 155, 150, 154, 717/160, 161, 140; 712/241, 237, 23, 200, 712/201, 233, 234
See application file for complete search history.

(56) References Cited

U.S. PATENT DOCUMENTS

| | | | | |
|---|---|---|---|---|
| 4,656,583 | A * | 4/1987 | Auslander et al. | 717/153 |
| 5,317,740 | A * | 5/1994 | Sites | 717/129 |
| 5,333,280 | A * | 7/1994 | Ishikawa et al. | 712/241 |
| 5,596,733 | A * | 1/1997 | Worley et al. | 712/244 |
| 5,636,366 | A * | 6/1997 | Robinson et al. | 711/163 |
| 5,799,179 | A * | 8/1998 | Ebcioglu et al. | 712/234 |
| 5,958,061 | A * | 9/1999 | Kelly et al. | 714/1 |
| 5,966,537 | A * | 10/1999 | Ravichandran | 717/158 |
| 6,247,172 | B1 * | 6/2001 | Dunn et al. | 717/141 |
| 6,286,132 | B1 * | 9/2001 | Tanaka et al. | 717/125 |
| 6,324,643 | B1 * | 11/2001 | Krishnan et al. | 712/237 |
| 6,412,109 | B1 * | 6/2002 | Ghosh | 717/155 |
| 6,446,197 | B1 * | 9/2002 | Krishnan et al. | 712/237 |
| 6,477,639 | B1 * | 11/2002 | Krishnan et al. | 712/237 |

(Continued)

OTHER PUBLICATIONS

TITLE: An Out-of-Order Execution Technique for Runtime Binary Translators, author: Le, ACM, 1998.*

(Continued)

*Primary Examiner*—Chameli C. Das
(74) *Attorney, Agent, or Firm*—Jesse L. Abzug, Esq.; McGinn IP Law Group, PLLC

(57) ABSTRACT

An optimization apparatus (compiler program, method and recording medium) for changing the order of execution of instructions in a program to be optimized includes an exception occasion instruction detection section which detects a first instruction having a possibility to cause an exception, an assurance instruction detection section which detects a second instruction executed prior to the first instruction, the second instruction assuring that no exception of the first instruction occurs, and an execution order control section which changes the position of the first instruction in execution order so that the first instruction is executed before a conditional branch instruction for selectively executing the first instruction and after the second instruction.

15 Claims, 10 Drawing Sheets

U.S. PATENT DOCUMENTS

| | | | |
|---|---|---|---|
| 6,513,109 B1 * | 1/2003 | Gschwind et al. | 712/200 |
| 6,519,765 B1 * | 2/2003 | Kawahito et al. | 717/217 |
| 6,631,514 B1 * | 10/2003 | Le | 717/137 |
| 6,634,023 B1 * | 10/2003 | Komatsu et al. | 717/159 |
| 6,665,864 B1 * | 12/2003 | Kawahito et al. | 717/151 |
| 6,807,621 B1 * | 10/2004 | Strombergson et al. | 712/23 |
| 6,915,410 B1 * | 7/2005 | Hyduke | 712/17 |
| 6,931,635 B1 * | 8/2005 | Inagaki et al. | 717/157 |

OTHER PUBLICATIONS

TITLE: Optimization for a Superscale Out-of-Order Machine, author: Holler, IEEE, 1996.*

M. Kawahito et al., "Eliminating Exception Checks and Partial Redundancies for Java Just-in-Time Compilers", TRL Research Report RT0350 2000, Apr. 3, 2000, pp. 1-18.

* cited by examiner

```
1: nullcheck a;
2: u = a.f2;
3: if (a != b) {
4:
5:     t = a.f1;
6: }
```

FIGURE 4 (A)

```
1:  if (a != null) {
2:
3:      t = a.f1;
4:  }
```

FIGURE 4 (B)

```
1:  if (a != null) {
2:      dummy_nullcheck a;
3:      t = a.f1;
4:  }
```

FIGURE 5 (A)

```
1: nullcheck a;
2: boundcheck 0, a[];
3: a[0] = 0;
4: if (0 <= i && i < a.arraylength) {
5:
6:
7:     t = a[i];
8: }
```

FIGURE 5 (B)

```
1: nullcheck a;
2: boundcheck 0, a[];
3: a[0] = 0;
4: if (0 <= i && i < a.arraylength) {
5:     dummy_boundcheck i, a[];
6:     t = a[i];
7: }
```

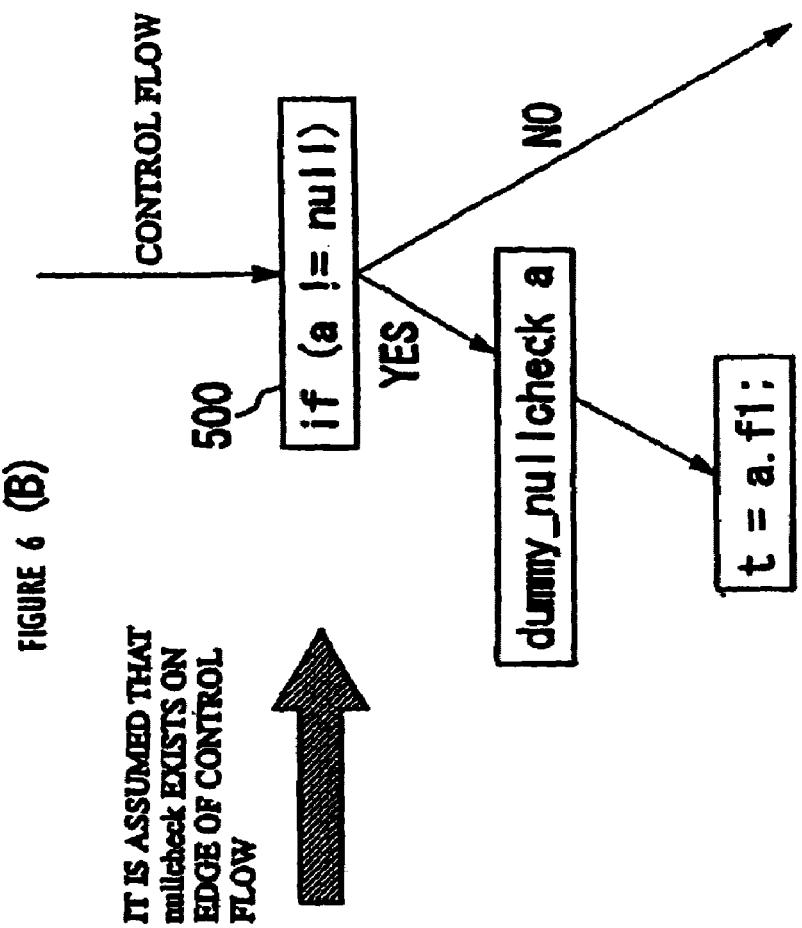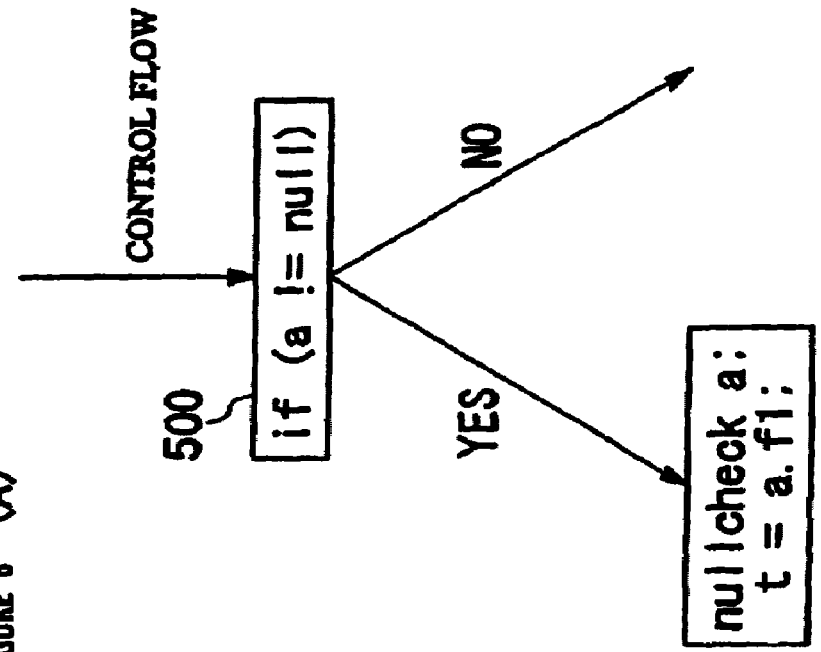
FIGURE 6 (A)
FIGURE 6 (B)
IT IS ASSUMED THAT nullcheck EXISTS ON EDGE OF CONTROL FLOW

```
1:   private int scanToken(int startPos) {
2:     int position = startPos;
3:     if (position < this.maxPosition) {
4:       do {
5:         char c;
6:         nullcheck this.str;
7:         if ((position < 0) || (position >= this.str.count)) {
8:           throw new StringIndexOutOfBoundsException(position);
9:         } else {
10:          c = this.str.Value[position + this.str.offset]
11:          if ((c <= this.maxDelimChar) &&
12:              (this.delimiters.indexOf(c) >= 0))
13:            break;
14:          position++;
15:        }
16:      } while (position < this.maxPosition);
17:  }
```

FIG.8

```
1:   private int scanToken(int startPos) {
2:     int position = startPos;
3:     T_maxPosition = this.maxPosition;
4:     if (position < T_maxPosition) {
5:       T_str = this.str;
6:       nullcheck T_str;
7:       do {
8:         char c;
9:         if ((position < 0) || (position >= T_str.count)) {
10:          throw new StringIndexOutOfBoundsException(position);
11:        } else {
12:          c = T_str.value[position + T_str.offset]
13:          if ((c <= this.maxDelimChar) &&
14:              (this.delimiters.indexOf(c) >= 0))
15:            break;
16:          position++;
17:        }
18:      } while (position < T_maxPosition);
19:  }
```

FIG.9

```
1:   private int scanToken(int startPos) {
2:     int position = startPos;
3:     T_maxPosition = this.maxPosition;
4:     if (position < T_maxPosition) {
5:       T_str = this.str;
6:       nullcheck T_str;
7:       T_value = T_str.value;
8:       T_offset = T_str.offset;
9:       T_count = T_str.count;
10:      T_maxDelimChar = this.maxDelimChar;
11:      T_delimiters = this.delimiters;
12:      do {
13:        char c;
14:        if ((position < 0) || (position >= T_count)) {
15:          throw new StringIndexOutOfBoundsException(position);
16:        } else {
17:          c = T_value[position + T_offset]
18:          if ((c <= T_maxDelimChar) &&
19:            (T_delimiters.indexOf(c) >= 0))
20:            break;
21:          position++;
22:        }
23:      } while (position < T_maxPosition);
24:   }
```

FIG.10

OPTIMIZATION APPARATUS, COMPLIER PROGRAM, OPTIMIZATION METHOD AND RECORDING MEDIUM

BACKGROUND OF THE INVENTION

1. Field of the Invention

The present invention generally relates to an optimization apparatus, a compiler program, an optimization method, and a recording medium. More particularly, the present invention relates to an optimization apparatus, a compiler program, an optimization method, each comprising changing the order of execution of instructions, and a recording medium on which the compiler program is recorded.

2. Description of the Related Art

A method of speculative code movement in which the order of execution of instructions is changed in disregard of a conditional branch instruction or the like is proposed in "Eliminating Exception Checks and Partial Redundancies for Java Just-in-Time Compilers" written by Motohiro Kawahito, Hideaki Komatsu, and Toshio Nakatani and contained in TRL Research Report RT0350 2000.

In the above-described method, however, the order of execution of memory access instructions having a possibility to cause an exception cannot be changed so that the memory access instruction is speculatively executed. For this reason, various kinds of optimization enabled by changing the order of execution of memory access instructions cannot be performed.

SUMMARY OF THE INVENTION

In view of the foregoing and other problems, drawbacks, and disadvantages of the conventional methods and structures, a feature of the present invention is to provide an optimization apparatus, a compiler program, an optimization method and a recording medium as means for solving the above-described problem.

According to a first exemplary aspect of the present invention, an optimization apparatus changes the order of execution of instructions in a program. The apparatus includes an exception occasion instruction detection section which detects a first instruction having a possibility to cause an exception, an assurance instruction detection section which detects a second instruction executed prior to the first instruction, the second instruction assuring that no exception of the first instruction occurs, and an execution order control section which changes the position of the first instruction in execution order so that the first instruction is executed before a conditional branch instruction for selectively executing the first instruction and after the second instruction.

The first exemplary aspect preferably further includes a compiler program for realizing the optimization apparatus, a recording medium on which the compiler program is recorded, and an optimization method.

According to a second exemplary aspect of the present invention, an optimization apparatus optimizes a program by changing the order of execution of instructions in the program. The apparatus includes a dummy instruction generation section which is used when a change of the instruction execution order is restricted, and which generates a dummy instruction not to perform substantial processing, and an execution order control section which performs optimization by changing the instruction execution order while restricting change of the execution order over the dummy instruction.

The second exemplary aspect preferably further includes a compiler program for realizing the optimization apparatus, a recording medium on which the compiler program is recorded, and an optimization method.

The above-described summary of the invention is not a combination of all the necessary features of the present invention, and sub-combinations of these features can also represent the present invention.

The entire contents of Examined Japanese Application Number JP2002-219853 are incorporated herein by reference.

BRIEF DESCRIPTION OF THE DRAWINGS

The foregoing and other purposes, aspects and advantages will be better understood from the following detailed description of an exemplary embodiment of the invention with reference to the drawings, in which:

FIGS. 3A and 3B show a speculative movement of a memory access instruction in accordance with an exemplary embodiment of the invention;

FIGS. 4A and 4B show an example of restriction of instruction execution order by a dummy instruction in accordance with an exemplary embodiment of the invention;

FIGS. 5A and 5B show another example of restriction of instruction execution order by a dummy instruction in accordance with an exemplary embodiment of the invention;

FIGS. 6A and 6B show the concept of restriction of execution order by a dummy instruction in accordance with an exemplary embodiment of the invention;

FIG. 8 is a diagram showing an example of a program to be optimized;

FIG. 9 is a diagram showing the results of non-speculative change of execution order in the program to be optimized in accordance with an exemplary embodiment of the invention;

FIG. 10 is a diagram showing the results of speculative change of execution order in the program to be optimized in accordance with an exemplary embodiment of the invention.

DETAILED DESCRIPTION OF EXEMPLARY EMBODIMENTS OF THE INVENTION

Figure 1:
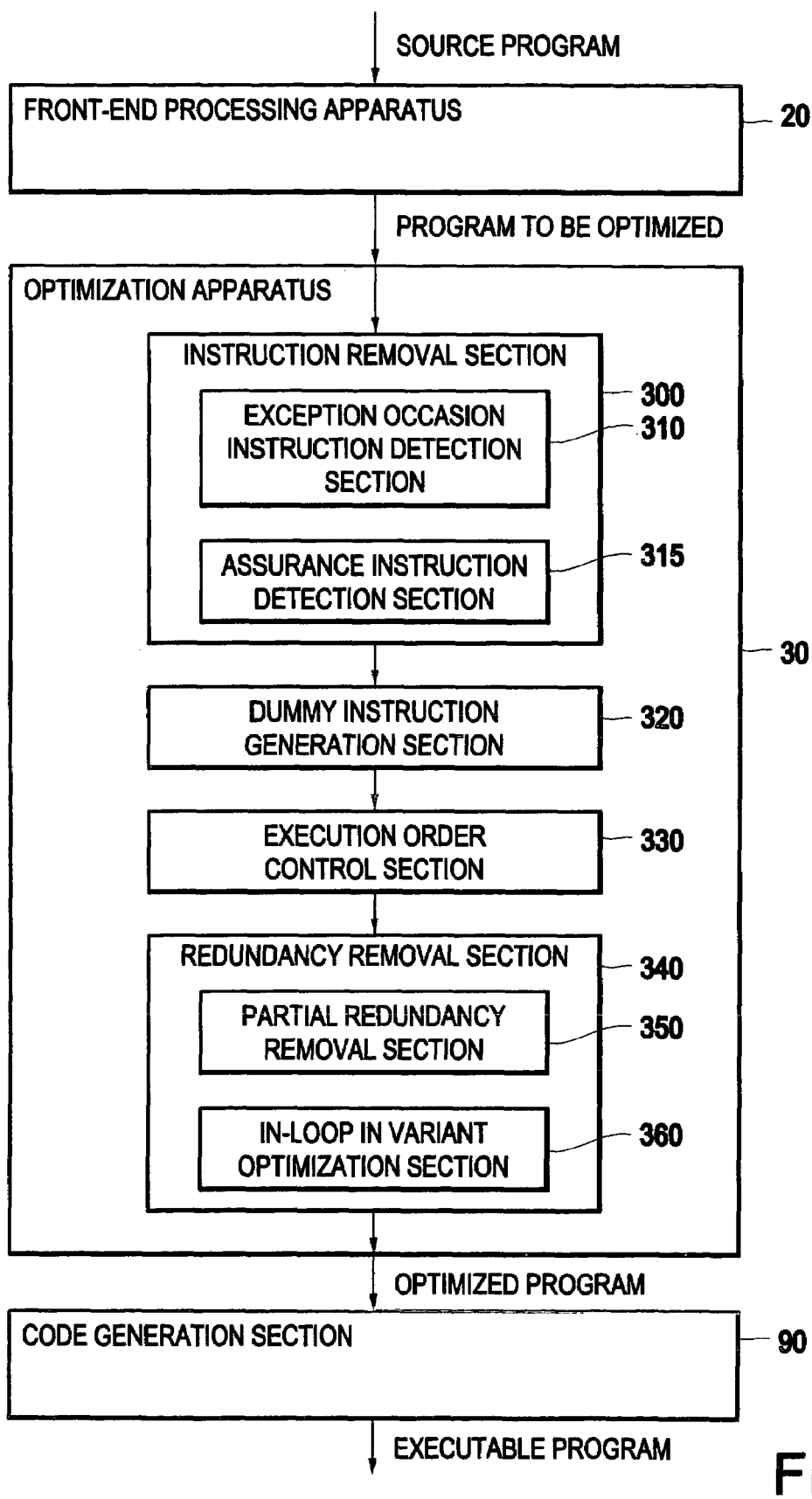
FIG. 1 is a functional block diagram of a compiler in accordance with an exemplary embodiment of the invention.

Referring now to the drawings, and more particularly to FIGS. 1–11, the present invention will be described with respect to an exemplary embodiment. The exemplary embodiment described below does not limit the present invention set forth in the appended claims, and some of the combinations of features described with respect to the exemplary embodiment may not be requisite to the solving means in accordance with the present invention.

FIG. 1 is a functional block diagram of a compiler 10. The compiler 10 receives an externally supplied source program, and converts this source program into execution codes executable by a computer. In processing for conversion into execution codes, the compiler 10 performs an optimization for effective use of computer resources, such that the speed of execution of the execution codes is increased and the execution codes are reduced in size.

The compiler 10 includes a front-end processing apparatus 20, an optimization apparatus 30, and a code generation section 90. When the front-end processing apparatus 20 receives an externally supplied source program, it converts the source program into an intermediate expression suitable for optimization processing (e.g., Intermediate Representation) and sends the converted source program to the optimization apparatus 30 as a program to be optimized. The optimization apparatus 30 performs various optimizations of the received program to be optimized and sends the optimized program to the code generation section 90. The code generation section 90 converts the received optimized program into a form executable by the computer and an operating system and outputs the converted program from the compiler 10.

In this embodiment, the program to be optimized is, for example, an intermediate expression such as JAVA® byte codes or RTL (an acronym for Register Transfer Language) (e.g., Intermediate Representation). Another example of the program to be optimized is a program itself written in a surface language such as JAVA® or the C language. JAVA® is a trademark of Sun Microsystems, Incorporated. The program to be optimized may be the whole of a program written in such a representation, or a portion of such a program formed as a module or an object for performing only a particular kind of processing.

The optimization apparatus 30 includes an instruction removal section 300, a dummy instruction generation section 320, an execution order control section 330, and a redundancy removal section 340. The instruction removal section 300 includes an exception occasion instruction detection section 310 and an assurance instruction detection section 315. The exception occasion instruction detection section 310 detects, in the program received from the front-end processing apparatus 20 to be optimized, a first instruction which has a possibility to cause an exception indicating a fault in instruction processing or the like, and an exception check instruction executed immediately before the first instruction to determine whether an exception according to the first instruction occurs. The assurance instruction detection section 315 detects a second instruction which is executed prior to the first instruction and the exception check instruction to assure that no exception of the first instruction occurs. If it is assured by the second instruction that no exception of the first instruction occurs, then the exception check instruction is unnecessary and the instruction removal section 300 removes the exception check instruction.

If the program to be optimized is described in a language such as Java® having a type safety, a type safety check is made by software and the exception check instruction is therefore written explicitly. Accordingly, the exception occasion instruction detection section 310 detects a dynamic type check instruction such as the exception check instruction or the like.

If the program to be optimized is a program written in a language such as the C language having no type safety, part of a type safety check is performed by hardware and, therefore, the exception check instruction is not explicitly described. In this case, the exception occasion instruction detection section 310 may detect the first instruction only.

The instruction removal section 300 also deletes a redundant instruction other than the exception check instruction. For example, if the program to be optimized includes the exception check instruction and a conditional branch instruction executed after the exception check instruction to make a redundancy determination in association with the exception check instruction, the instruction removal section 300 removes the conditional branch instruction and removes the branch destination of the conditional branch instruction which is to be executed when the condition is not satisfied.

The instruction removal section 300 sends the program to be optimized to the dummy instruction generation section 320 after performing the above-described removal processing on the program.

The dummy instruction generation section 320 receives the program to be optimized after removal processing from the instruction removal section 300 and detects, in conditional branch instructions (e.g., an IF statement and a WHILE statement) in the program to be optimized, an instruction including a branch condition enabling assurance that no exception of instructions selectively executed by the conditional branch instruction occurs.

For example, if the kind of the first instruction is a memory access instruction, the dummy instruction generation section 320 determines whether a conditional branch instruction is an instruction for branching depending on whether a variable designating and address in a memory to be accessed has a valid address value.

The dummy instruction generation section 320 generates a dummy instruction, which can be an instruction accompanied by no substantial processing, on the control flow from the conditional branch instruction to an instruction having a possibility to cause an exception, the dummy instruction being generated at such a position on the control flow as to be executed immediately after a conditional branch instruction. The dummy instruction generation section 320 sends the program to be optimized, having the dummy instruction inserted therein, to the execution order control section 330.

Alternatively, the dummy instruction generation section 320 may generate, with respect only to a conditional branch instruction including an instruction which has a possibility to cause an exception at a branch destination, a dummy instruction, which can be an instruction accompanied by no substantial processing, on the control flow from the conditional branch instruction to the instruction having a possibility to cause an exception, the dummy instruction being generated at such a position on the control flow as to be executed immediately after the conditional branch instruction. The execution order control section 330 receives the program to be optimized from the dummy instruction generation section 320 and changes the execution order by operations including changing the positions of the instructions in execution codes while restricting the change of the execution order so that the first instruction is not placed before the dummy instruction.

For example, the execution order control section 330 may change the position in execution order of the first instruction so that the first instruction is executed after the second instruction and before a conditional branch instruction accompanied by no dummy instruction in conditional branch instructions selectively executing the first instruction. The execution order control section 330 sends to the redundancy removal section 340 the program to be optimized, having the instruction execution order changed.

The above-described dummy instruction is used for the purpose of maintaining the dependence relationship between executions of instructions and may not be actually formed as an execution code. That is, the execution order control section 330 changes the position of the first instruction in execution order by assuming that a dummy instruction exists, but the code generation section 90 may generate no execution code with respect the dummy instruction. The code generation section 90 may generate an instruction accompanied by no substantial processing (e.g., a NOP instruction).

The redundancy removal section 340 includes a partial redundancy removal section 350 and an in-loop invariant optimization section 360. The redundancy removal section 340 removes redundant instructions redundant with some other instructions with respect to details of processing and sends the optimized program to the code generation section 90.

For example, when an instruction which is executed only at one of a plurality of control flow points upstream of a control flow confluent point and an instruction executed at a point downstream of the confluence point are identical in content to each other, the partial redundancy removal section 350 removes the instruction on the downstream side while enabling execution of the instructions at the plurality of points on the confluence upstream side, thus removing a partial redundancy.

The in-loop invariant optimization section 360 performs processing for moving out of a loop an access instruction for reading out an invariant value in the loop by analyzing the program to be optimized.

Thus, the optimization apparatus 30 removes the exception check instruction for detecting the occurrence of an exception of the first instruction when it is assured by the second instruction that no exception of the first instruction occurs. Also, the optimization apparatus 30 generates a dummy instruction on the control flow from a conditional branch instruction assuring that no exception of the first instruction occurs to the first instruction in the program to be optimized, the dummy instruction being generated at such a position on the control flow as to be executed immediately after the conditional branch instruction. The optimization apparatus 30 changes the position of the first instruction in execution order while maintaining the dependence relationship between the executions of the dummy instruction and the first instruction. Consequently, the optimization apparatus 30 can change the position in execution order of the first instruction having a possibility to cause an exception while enabling the meaning and operation of the program to be optimized to be reflected with fidelity, and can therefore increase the speed of execution of the program to be optimized.

Figure 2:
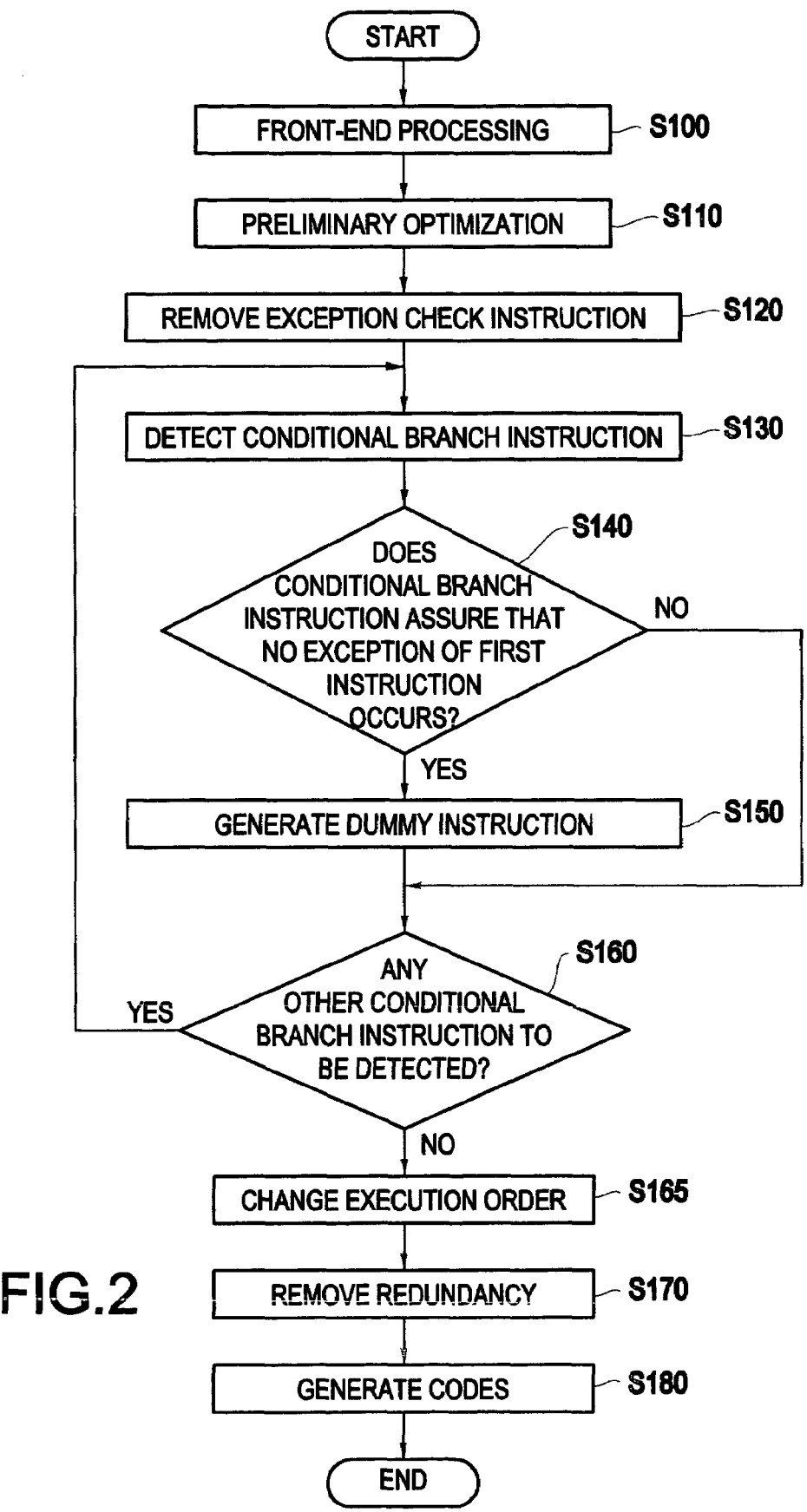
FIG. 2 is a flowchart of the operation of the compiler of FIG. 1.

FIG. 2 is a flowchart of an exemplary operation of the compiler 10. The front-end processing apparatus 20 performs front-end processing for converting an externally supplied source program into an intermediate expression or the like suitable for optimization processing (S100).

The optimization apparatus 30 may perform various kinds of optimization on the program to be optimized prior to removal of an exception check instruction performed by the instruction removal section 300 (S110). For example, the optimization apparatus 30 may perform optimization such as inlining of a method and a function, removal of a common partial expression, etc.

The instruction removal section 300 then removes a redundant exception check instruction from the program to be optimized (S120). The instruction removal section 300 may remove redundant instructions other than the exception check instruction. For example, if the program to be optimized includes an exception check instruction and a conditional branch instruction based on the exception check instruction and a redundancy condition and executed after the exception check instruction, the instruction removal section 300 removes the conditional branch instruction.

The compiler 10 repeats processing described below on the program to be optimized. The dummy instruction generation section 320 detects a conditional branch instruction in the program to be optimized (S130).

If the dummy instruction generation section 320 determines that the conditional branch instruction assures that no exception of the first instruction occurs (S140: YES), it generates a dummy instruction at such a position on the control flow from the conditional branch instruction to the first instruction that the dummy instruction is executed immediately after the conditional branch instruction (S150). For example, if the first instruction is a memory access instruction, the dummy instruction generation section 320 detects a conditional branch instruction having a branch condition as to whether or not the value of a variable designating an address in a memory to be accessed is valid.

The optimization apparatus 30 continues processing by returning to S130 if it is determined that another conditional branch instruction exists as a candidate for generation of a dummy instruction (S160: YES).

Subsequently, the execution order control section 330 performs optimization by changing the instruction execution order while restricting the change of the execution order so that the first instruction is not placed before the dummy instruction (S165).

The redundancy removal section 340 removes redundancy from the program to be optimized after the instruction execution order therein has been changed (S160). The code generation section 90 generates execution codes on the basis of the optimized program. When generating execution codes, the code generation section 90 generates no execution code with respect to the dummy instruction.

Thus, it is possible to change the instruction execution order by restricting the change of the execution order so that the first instruction is not placed before the dummy instruction, while maintaining the essential operation and meaning of the program to be optimized. For example, if the program to be optimized is a program which is described in JAVA® or the like and whose type safety is assured, the optimization apparatus 30 may perform such optimization that the speed of the program to be optimized is increased while maintaining the type safety.

FIGS. 3(A) and 3(B) show an example of a speculative movement of a memory access instruction. FIGS. 3(A) and 3(B) respectively show programs to be optimized by being input to the optimization apparatus 30.

In this embodiment, an intermediate expression in a form suitable for optimization is input to the optimization apparatus 30. As shown in FIGS. 3A to 5B and 7A to 9, however, expressions in a pseudo language showing the meanings of programs to be optimized are used for simplification of description.

FIG. 3(A) shows an example of when the position in execution order of a memory access instruction which is the first instruction cannot be changed. The program shown in FIG. 3(A) is for reading to a variable t a content of a memory at an address determined by adding a predetermined value to an address designated by a variable "a" (third line) only when the value of the variable "a" and the value of a variable b are different from each other (second line).

In a computer executing execution codes generated by the exemplary compiler 10, the time required for processing for reading out values from a memory is longer than the time required for processing for computing by using the read values. Therefore, it is possible for the optimization apparatus 30 to increase the total speed of the program to be optimized if it changes the instruction execution order so as to execute a memory access instruction such as shown at the third line as early as possible.

However, the program cannot be correctly executed if the optimization apparatus 30 moves the memory access information shown at the third line to the first line by jumping it over the conditional branch instruction shown at the second line, for the reason described below.

That is, if the variable "a" and the variable b are equal to each other, and if the variable "a" is an invalid value, the optimization apparatus 30 causes an exception indicating that the value of the variable "a" is invalid. If the variable "a" and the variable b are equal to each other in the original program, the memory access instruction at the third line and, therefore, occurrence of such an exception is not possible.

Consequently, the optimization apparatus 30 cannot enable the operation of the original program to be reflected in the optimized program with fidelity if it moves the memory access instruction as described above.

FIG. 3(B) shows an example of when the position in execution order of a memory access instruction which is the first instruction can be changed. The program to be optimized, which is input to the optimization apparatus 30, has, as shown in FIG. 3(B), a null check instruction for detection as to whether the variable "a" is a valid value (referred to as (1) in the following description with reference to this figure), an instruction to read to a variable u a content of the memory at an address determined by adding a predetermined value to an address designated by the variable "a" (referred to as (2) in the following description with reference to this figure), an instruction to determine whether the values of the variable "a" and the variable b are different from each other (referred to as (3) in the following description with reference to this figure), a nullcheck instruction on the variable "a" (referred to as (4) in the following description with reference to this TRANSMISSION APPARATUS THEREFOR figure), and an instruction to read to a variable t a content of the memory at an address determined by adding a predetermined value to an address designated by the variable "a" (referred to as (5) in the following description with reference to this figure).

The exception occasion instruction detection section 310 detects (5) as the first instruction. The assurance instruction detection section 315 detects (1) as the second instruction assuring that no exception of (5) occurs. Then, the instruction removal section 300 can remove, as a redundant instruction, (4) corresponding to (5) for which it is assured that no exception occurs.

Accordingly, the optimization apparatus 30 can change the instruction execution order so that (5) is speculatively executed before (3) and after (1) while maintaining the order of execution of (1), (4), and (5). For example, the optimization apparatus 30 can change the instruction execution order so that (5) is executed between (2) and (3).

Thus, when the second instruction (e.g., (1)) assuring that no exception occurs is detected, the optimization apparatus 30 can change the position of the first instruction (e.g., (5)) having a possibility to cause an exception so that the first instruction is executed before a conditional branch instruction (e.g., (3)) for selectively executing the first instruction.

FIGS. 4(A) and 4(B) show an example of when change of instruction execution order is restricted by a dummy instruction. The program to be optimized, which is input to the optimization apparatus 30, has, as shown in FIG. 4(A), a branch instruction based on a condition as to whether the value of a variable "a" is a null value which is an invalid address (referred to as (1) in the following description with reference to this figure), a null check instruction with respect to the variable "a" (referred to as (2) in the following description with reference to this figure), and an instruction to read to a variable t a content of the memory at an address determined by adding a predetermined value to an address designated by the variable "a" (referred to as (3) in the following description with reference to this figure).

The exception occasion instruction detection section 310 detects (2), and the assurance instruction detection section 315 detects (1) as the second instruction assuring that no exception of (2) occurs. As a result, the instruction removal section 300 removes (2).

The dummy instruction generation section 320 determines that the branch condition of the conditional branch instruction (1) assures that no exception of the first instruction occurs, and generates a "dummy_nullcheck" instruction as a dummy instruction at such a position that the dummy instruction is executed before (3) and after (1) (FIG. 4(B)).

As described above, the optimization apparatus 30 removes an exception check instruction. Also, the optimization apparatus 30 generates a dummy instruction at such a position on the control flow from a conditional branch instruction to the first instruction that the dummy instruction is executed immediately after the conditional branch instruction. Thus, the optimization apparatus 30 can change the execution order so that a memory access instruction such as (3) is not placed before a dummy instruction, and can, therefore, perform such optimization that the instruction execution order is suitably changed.

In the example shown in this figure, the assurance instruction detection section 315 detects, as a conditional branch instruction, a branch instruction based on a condition as to whether the value of a variable "a" is a null value which is an invalid address value. For example, if the program to be optimized is JAVA® byte codes, the assurance instruction detection section 315 detects an ifnull instruction, ifnonnull instruction and an isinstance of instruction as a conditional branch instruction.

FIGS. 5(A) and 5(B) show another example of the case where change of instruction execution order is restricted by a dummy instruction. The program to be optimized, which is input to the optimization apparatus 30, has, as shown in FIG. 5(A), a nullcheck instruction with respect to an array variable "a" (referred to as (1) in the following description with reference to this figure), a boundcheck instruction to generate an exception according to whether a suffix 0 to the array variable "a" is within the range corresponding to the size of the array variable (referred to as (2) in the following description with reference to this figure), an instruction to substitute 0 for the 0th element in the array variable "a" (referred to as (3) in the following description with reference to this figure), a conditional branch instruction based on a determination as to whether a variable i is within the range corresponding to the size of the array variable "a" (referred to as (4) in the following description with reference to this figure), a nullcheck instruction with respect to the array variable "a" (referred to as (5) in the following description with reference to this figure), a boundcheck instruction with respect to the array variable "a" and a suffix i (referred to as (6) in the following description with reference to this figure), and an instruction to read to a variable t a content of the memory at an address designated by the suffix i of the variable "a" (referred to as (7) in the following description with reference to this figure).

The exception occasion instruction detection section 310 detects (7) which is the first instruction and (5) and (6) which are exception check instructions related to (7). The assurance instruction detection section 315 detects (1) as an instruction assuring that no exception of (5) occurs, and detects (4) as an instruction assuring that no exception of (6) occurs. Consequently, the instruction removal section 300 removes both (5) and (6).

In this embodiment, the assurance instruction detection section 315 detects (4) as an instruction assuring that no exception of (6) occurs. Alternatively, the assurance instruction detection section 315 may detect a conditional branch instruction for executing (6) only when a condition restricted by the condition for occurrence of an exception of (6) is satisfied. For example, the assurance instruction detection section 315 may detect, as a condition restricted by the condition for occurrence of an exception of (6), an instruction to execute (6) as the second instruction only when the value of the variable i is equal to or larger than 0 and equal to or smaller than half the length of the array variable (e.g., if (0<=&&i<a.arraylength/2).

Thereafter, since the conditional branch instruction (4) assures that no exception of (7) occurs as shown in FIG. 5(A), the dummy instruction generation section 320 generates a dummy_boundcheck instruction as a dummy instruction at such a position on the control flow from (4) to (7) that the dummy instruction is executed immediately after (4) (FIG. 5(B)). Consequently, the execution order control section 330 can perform such optimization that the instruction execution order is changed while restricting the change of the execution order so that (7) is not placed before (4).

As described above, the optimization apparatus 30 removes an exception check instruction and, when detecting a conditional branch instruction assuring that no exception occurs, generates a dummy instruction at such a position that the dummy instruction is executed immediately after the conditional branch instruction. Consequently, the optimization apparatus 30 can perform such optimization that the instruction execution order is changed while suitably maintaining the execution dependence relationship by using a dummy instruction.

FIGS. 6(A) and 6(B) show the concept of restriction of execution order by a dummy instruction. As shown in FIGS. 6(A) and 6(B), change of instruction execution order is restricted by the dummy_nullcheck instruction shown in FIGS. 4(A) and 4(B). Fundamental blocks 500 correspond to (1) shown in FIGS. 4(A) and 4(B) and indicate the instruction for conditional branching based on determination as to whether the variable "a" is a null value. The arrow indicating the input to each fundamental block 500 and the arrow indicating the output from the fundamental block 500 represent the control flow of the program to be optimized shown in FIGS. 4(A) and 4(B).

As shown in FIG. 6(A), if the variable "a" is not a null value in the program to be optimized before optimization, processing of "nullcheck a" shown in FIG. 4(A) is performed. In optimization by the optimization apparatus 30, the instruction removal section 300 removes "nullcheck a" in FIG. 4(A) and the dummy instruction generation section 320 generates "dummy_nullcheck a", thereby generating the control flow shown in FIG. 6(B). That is, the dummy instruction generation section 320 generates the "dummy_nullcheck a" instruction at an intermediate point on the edge of the control flow to "t=a.f1" which is the instruction to be next executed, as shown in FIG. 6(B).

Thus, the optimization apparatus 30 can restrict change of execution order so that an instruction such as "t=a.f1" is not executed before a conditional branch instruction, by generating a dummy instruction at an intermediate point on the edge of the control flow output from the conditional branch point. Consequently, the optimization apparatus 30 can realize high-speed execution by changing the position of a memory access instruction or the like in execution order while assuring that the optimized program can be correctly executed.

FIGS. 7(A) and 7(B) show an example of a control flow for restricting change of execution order. In FIGS. 7(A) and 7(B), the flow of control of a program to be optimized is schematically represented by fundamental blocks shown as rectangular areas and solid line arrows connecting the rectangular areas.

The program to be optimized has a fundamental block 600 first executed, a fundamental block 610 which is executed subsequently to the fundamental block 600 and which forms a branch to a fundamental block 620 if a variable "a" is not a null value, the fundamental block 620 which is executed when the condition according to the fundamental block 610 is satisfied, a fundamental block 630 which is executed subsequently to the fundamental block 620 and which includes a conditional branch instruction, a fundamental block 640 which is executed when the condition according to the fundamental block 630 is satisfied, a fundamental block 650 which is executed subsequently to the fundamental block 640 and which includes a conditional branch instruction, and a fundamental block 660 which is executed subsequently to the fundamental block 650 and which includes a conditional branch instruction. Each of the conditional branch instructions of the fundamental blocks 650 and 660 forms a loop by processing for return to the fundamental block 630 or 610.

The fundamental block 640 has a nullcheck instruction with respect to the variable "a", a memory access instruction "F=a.f" having the variable "a" as an address value, and an instruction "t+=F" for obtaining a cumulative sum by adding the value of a variable F to a variable t. The optimization apparatus 30 detects in the fundamental block 610 an instruction assuring that no exception of the memory access instruction "F=a.f" occurs, and removes the nullcheck instruction with respect to the variable "a".

If the optimization apparatus 30 moves the memory access instruction "F=a.f" to the fundamental block 600, the program cannot be correctly executed, for the reason described below. If the variable "a" is a null value, it is possible that the program to be optimized will cause an exception as a case in which the address of the memory to be accessed is invalid.

On the other hand, in the original program to be optimized, the memory access instruction "F=a.f" in the fundamental block 640 is not executed if the variable "a" is a null value, and, therefore, such an exception does not occur. Thus, if the optimization apparatus 30 moves the memory access instruction as described above, it cannot enable the operation of the program to be optimized to be reflected in the optimized program with fidelity. For example, it cannot assure the type safety which is to be assured in the program to be optimized.

Then, as shown in FIG. 7(B), the dummy instruction generation section 320 generates a fundamental block 615 containing dummy_nullcheck at such a position that the block 615 is executed after the conditional branch instruction of the fundamental block 610 capable of assuring that no exception of the instruction selectively executed occurs, and before the memory access instruction "F=a.f". Also, the execution order control section 330 restricts the change of the execution order so that the memory access instruction "F=a.f" is not moved to a position before the fundamental block 615.

On the other hand, the execution order control section 330 may change the execution order so that the memory access instruction "F=a.f" is executed after the fundamental block 615 and before the fundamental block 630 containing a conditional branch instruction. For example, when the execution order control section 330 moves the memory access instruction "F=a.f" to the fundamental block 620, it can enable the meaning and operation of the program to be optimized to be correctly reflected in the optimized program, thus assuring type safety.

FIG. 8 shows an example of a program to be optimized. In the program shown in FIG. 8, processing from the fourth line to the sixteenth line is repeated according to the result of determination at the sixteenth line. In each instance of repeated processing (loop), processing at the eighth line or processing from the tenth line to the fourteenth line is performed according to the result of determination at the seventh line.

At the sixteenth line in FIG. 8, "this.maxPosition" indicates the value of an address in the memory obtained by adding a predetermined value determined by a field name of maxPosition to the top address of this object. At the sixth, seventh and tenth lines in FIG. 8, "this.str" indicates the value of an address in the memory obtained by adding a predetermined value determined by a field name of str to the top address of this object.

If the address in the memory to be accessed by "this.maxPosition" or "this.str" is invalid, the program to be optimized causes an exception. In the case shown in this figure, memory accesses by "this.maxPosition" or "this.str" and exception checks for determination as to whether the address to be accessed is valid are executed each time the processing from the fourth line to the sixteenth line is repeated. Therefore, the efficiency is low.

Figure 7:
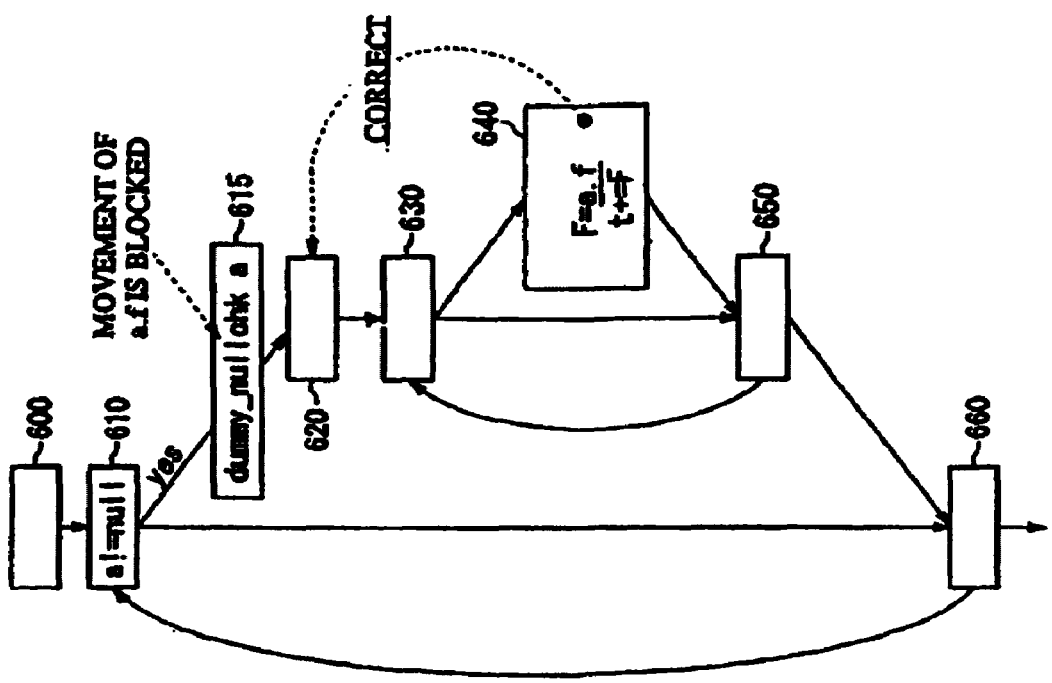
FIGS. 7A and 7B show an example of a control flow for restricting change of execution order by a dummy instruction in accordance with an exemplary embodiment of the invention.
Figure 7:
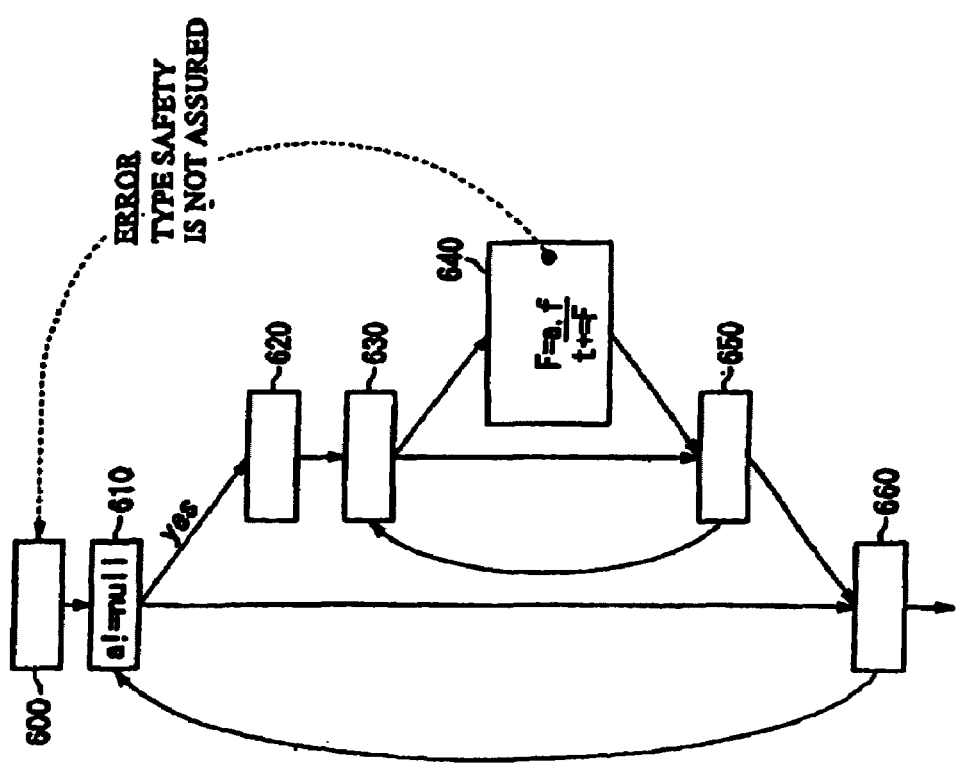

FIG. 9 shows the results of non-speculative change of execution order in the program to be optimized. At the eighteenth line in this figure, "this.maxPosition" shown at the sixteen line in FIG. 8 is replaced with a variable "T_maxPosition", and the value of "this.maxPosition" is substituted in the variable "T_maxPosition" at the third line. Also, "this.str" shown at the sixth, seventh and tenth lines in FIG. 7 are replaced with a variable "T_str" at the sixth, ninth and twelfth lines in this figure, and the value of "this.str" is substituted in the variable "T_str" at the fifth line.

Therefore, the compiler 10 can make accesses by "this.maxPosition" and "this.str" outside the loop from the seventh line to the eighteenth line, thus increasing the speed of the program to be optimized.

In the case shown in this figure, however, the compiler 10 cannot change the position in execution order of each of memory accesses by "T_str.count" shown at the ninth line, "T_str.value" shown at the twelfth line, "this.maxDelimChar" shown at the thirteenth line, and "this.delimisters" shown at the fourteenth line so that the memory access is executed before the conditional branching shown at the ninth line.

Therefore, while the value read out from the memory by each of these memory accesses is an invariant value in the loop, it is necessary for the program to be optimized to make access to the memory each time processing in the loop is repeated. Thus, an inefficient portion still exists.

FIG. 10 shows the results of speculative change of execution order in the program to be optimized in accordance with this embodiment. The instruction removal section 300 removes the exception check instructions with respect to the inefficient memory accesses shown in FIG. 9, and the execution order control section 330 changes the execution order so that these memory accesses are executed before the conditional branch instruction at the fourteenth line.

That is, the execution order control section 330 and the in-loop invariant optimization section 360 move the memory accesses shown in FIG. 9 to the seventh to eleventh lines in this figure to reduce the memory accesses in the loop and to thereby increase the speed of the program to be optimized.

Figure 11:
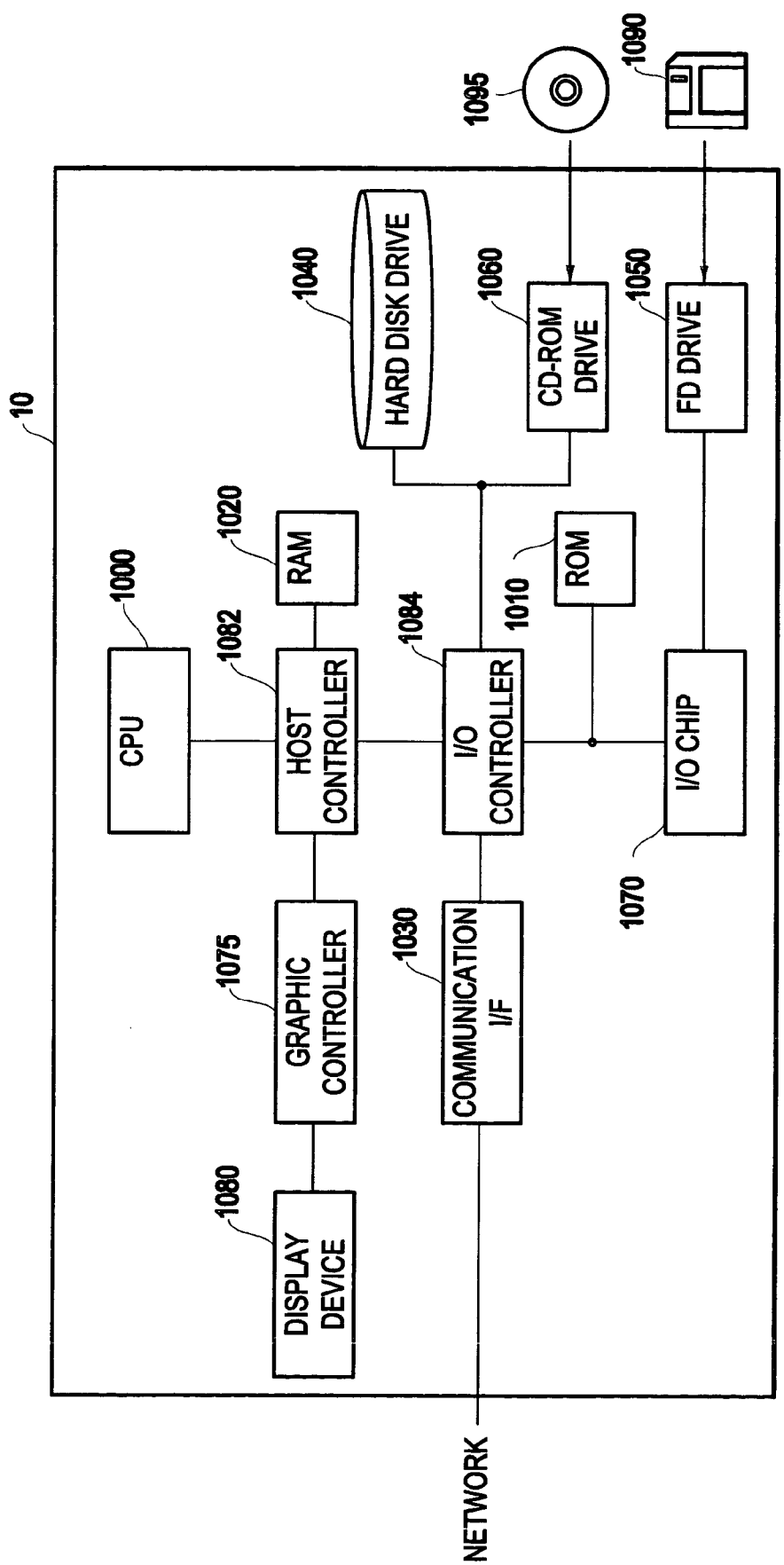
FIG. 11 is a diagram showing an example of the hardware configuration of the compiler of FIG. 1.

FIG. 11 shows an example of the hardware configuration of the compiler 10. The compiler 10 according to this embodiment is provided with a CPU peripheral having a CPU 1000, a RAM 1020, a graphic controller 1075, and a display device 1080. These components are connected to each other by a host controller 1082. The compiler 10 is also provided with an input/output section having a communication interface 1030, a hard disk drive 1040, and a CD-ROM drive 1060. These components are connected to the host controller 1082 by an input/output controller 1084. The compiler 10 is further provided with a legacy input/output section having a ROM 1010, a flexible disk drive 1050, and an input/output chip 1070. These components are connected to the input/output controller 1084.

The host controller 1082 is connected to the RAM 1020 and to the CPU 1000 and the graphic controller 1075 each accessing the RAM 1020 at a high transfer rate. The CPU 1000 operates on the basis of compiler programs stored in the ROM 1010 and the RAM 1020 to control each section. The graphic controller 1075 obtains image data generated on a frame buffer provided in the RAM 1020 by the CPU 1000 or the like, and displays the obtained image data on the display device 1080. Alternatively, the graphic controller 1075 may incorporate a frame buffer for storing image data generated by the CPU 1000 or the like.

The input/output controller 1084 connects the host controller 1082 to the communication interface 1030, the hard disk drive 1040, and the CD-ROM drive 1060, which are input/output devices of a comparatively high speed. The communication interface 1030 communicates with an external device via a network. The hard disk drive 1040 stores compiler programs and data used by the compiler 10. The CD-ROM drive 1060 reads a program or data from a CD-ROM 1095 and supplies the program or data to the input/output chip 1070 through the RAM 1020.

To the input/output controller 1084 are also connected the ROM 1010, the flexible disk drive 1050, the input/output chip 1070, etc., which are input/output devices of a comparatively low speed. The ROM 1010 stores a boot program executed by the CPU 1000 at the time of startup of the compiler 10, a program dependent on hardware in a personal computer main unit 110, etc. The flexible disk drive 1050 reads a compiler program or data from a flexible disk 1090, and supplies the program or data to the input/output chip 1070 through the RAM 1020. The input/output chip 1070 connects the flexible disk 1090 and also connects various input and output devices, for example, through a parallel port, a serial port, and keyboard and mouse ports.

A compiler program realizing the exemplary compiler 10 has an instruction removal module, an exception occasion instruction detection module, an assurance instruction detection module, a dummy instruction generation module, an execution order control module, a redundancy removal module, a partial redundancy removal module, and an in-loop invariant optimization module. These modules are programs for making the compiler 10 operate as the instruction removal section 300, the exception occasion instruction detection section 310, the assurance instruction detection section 315, the dummy instruction generation section 320, the execution order control section 330, the redundancy removal section 340, the partial redundancy removal section 350, and the in-loop invariant optimization module 360.

The compiler program provided to the compiler 10 may be provided by a user in a state of being stored on a recording medium, e.g., the flexible disk 1090, the CD-ROM 1095, or an IC card. This compiler program is read out from the recording medium and is installed in a storage system 200 and a backup device 300 through the input/output chip 1070 to be executed in the storage system 200 and the backup device 300. Alternatively, each of the storage system 200 and the backup device 300 may be further provided with a flexible disk drive, a CD-ROM drive, an IC card reader or the like and may read out the compiler program directly from the recording medium.

The above-described program or modules may be stored on an external storage medium. As the storage medium, an optical recording medium such as a DVD or a PD, an magneto-optical recording medium such as an MD, a tape medium, a semiconductor memory such as an IC card, or the like may be used as well as the flexible disk 1090 and the CD-ROM 1095. Also, a hard disk, a storage device such as a RAM, or the like provided in a server system connected to a special-purpose communication network or the Internet may be used as a recording medium to provide the compiler program to the compiler 10 via the network.

As is apparent from the above description, the exemplary compiler 10 can change the instruction execution order so that a memory access instruction or the like having a possibility to cause an exception is executed prior to a conditional branch instruction for selectively executing the memory access instruction. Therefore the compiler 10 can enable advancement of a start of execution of memory access or the like requiring a substantially long time for processing to increase the speed of the program to be optimized. Further, the compiler 10 performs various kinds of optimization enabled by this optimization to further increase the speed of the program to be optimized.

According to the above-described embodiment, an optimization apparatus, a compiler program and a recording medium shown in items below can be realized.

In a first exemplary embodiment of the present invention an optimization apparatus changes the order of execution of instructions in a program to be optimized. The apparatus has an exception occasion instruction detection section which detects a first instruction having a possibility to cause an exception, an assurance instruction detection section which detects a second instruction executed prior to the first instruction, the second instruction assuring that no exception of the first instruction occurs, and an execution order control section which changes the position of the first instruction in execution order so that the first instruction is executed before a conditional branch instruction for selectively executing the first instruction and after the second instruction.

Another aspect of the first exemplary embodiment, may further include a dummy instruction generation section which generates a dummy instruction, which is an instruction not to perform substantial processing, at such a position that the dummy instruction is executed after the conditional branch instruction and before the first instruction if it is assured by a branch condition in the conditional branch instruction that no exception of the instruction selectively executed by the conditional branch instruction occurs, wherein the execution order control section restricts change of the execution order so that the first instruction is not placed before the dummy instruction.

In another aspect of the first exemplary embodiment, the exception occasion instruction detection section may detect a memory access information as the first instruction, the exception occurs in a case where an address in a memory accessed by the memory access instruction is invalid, and the assurance instruction detection section detects as the second instruction an instruction for determination as to whether the address in the memory accessed by the memory access instruction is a valid address.

Further, the exception occasion instruction detection section may detect as the first instruction an instruction for reference to an address in the memory designated on the basis of a variable, and the assurance instruction detection section detects as the second instruction an instruction for determination as to whether the value of the variable is a null value indicating invalidity.

Further, the exception occasion instruction detection section may detect as the first instruction the memory access instruction for access to an array variable stored in the memory, and the assurance instruction detection section detects as the second instruction an instruction for determination as to whether a suffix to the array variable accessed by the memory access instruction is within the range corresponding to the size of the array variable.

In yet another aspect of the first exemplary embodiment where the program to be optimized includes an exception check instruction for detection as to whether an exception of the first instruction occurs, the exception check instruction being executed before the first instruction and after the conditional branch instruction; the exception occasion instruction detection section detects the exception check instruction; the assurance instruction detection section detects as the second instruction an instruction assuring that no exception of the exception check instruction occurs; an instruction removal section which removes the exception check instruction when the second instruction is detected is further provided; and the execution order control section changes the execution order so that the first instruction is executed before the conditional branch instruction while maintaining the order of execution of the second instruction, the exception check instruction and the first instruction in a case where the exception check instruction is not removed.

In another aspect of the first exemplary embodiment, the optimization apparatus further includes a redundancy removal section which removes a redundant instruction which is redundant with another instruction with respect to a processing content in the program to be optimized after the instruction execution order has been changed by the execution order control section.

In another aspect of the first exemplary embodiment, the optimization apparatus further includes a partial redundancy removal section which further removes a partial redundancy from the program to be optimized after the instruction execution order has been changed by the execution order control section.

In another aspect of the first exemplary embodiment, the optimization apparatus further includes an in-loop invariant optimization section which performs processing for moving, out of a loop, a memory access instruction for reading the value of invariant in the loop in the program to be optimized after the instruction execution order has been changed by the execution order control section.

In a second exemplary embodiment of the present invention, an optimization apparatus which optimizes a program to be optimized by changing the order of execution of instructions in the program includes a dummy instruction generation section which is used when change of the instruction execution order is restricted, and which generates a dummy instruction not to perform substantial processing, and an execution order control section which performs optimization by changing the instruction execution order while restricting change of the execution order over the dummy instruction.

In another aspect of the second exemplary embodiment, the optimization apparatus further includes an assurance instruction detection section which determines whether a branch condition in a conditional branch instruction in the program to be optimized assures that no execution of the first instruction selectively executed by the conditional branch instruction occurs, wherein the dummy instruction generation section generates a dummy instruction at such a position that the dummy instruction is executed after the conditional branch instruction and before the first instruction if it is determines that the branch condition assures that no exception of the first instruction occurs.

A third exemplary embodiment of the present invention includes a compiler program for making a computer change the order of instructions in a program to be optimized. Tthe compiler program making the computer function as an exception occasion instruction detection section which detects a first instruction having a possibility to cause an exception, an assurance instruction detection section which detects a second instruction executed prior to the first instruction, the second instruction assuring that no exception of the first instruction occurs, and an execution order control section which changes the position of the first instruction in execution order so that the first instruction is executed before a conditional branch instruction for selectively executing the first instruction and after the second instruction.

In another aspect of the third exemplary embodiment, the exception occasion instruction detection section may detect a memory access information as the first instruction, the exception occurs in a case where an address in a memory accessed by the memory access instruction is invalid, and the assurance instruction detection section detects as the second instruction an instruction for determination as to whether the address in the memory accessed by the memory access instruction is a valid address.

In another aspect of the third exemplary embodiment, when the program to be optimized includes an exception check instruction for detection as to whether an exception of the first instruction occurs, the exception check instruction being executed before the first instruction and after the conditional branch instruction; the exception occasion instruction detection section detects the exception check instruction; the assurance instruction detection section detects as the second instruction an instruction assuring that no exception of the exception check instruction occurs; an instruction removal section which removes the exception check instruction when the second instruction is detected is further provided; and the execution order control section changes the execution order so that the first instruction is executed before the conditional branch instruction while maintaining the order of execution of the second instruction, the exception check instruction and the first instruction in a case where the exception check instruction is not removed.

In another aspect of the third exemplary embodiment, the compiler program further includes a redundancy removal section which removes a redundant instruction which is redundant with another instruction with respect to a processing content in the program to be optimized after the instruction execution order has been changed by the execution order control section.

A fourth exemplary embodiment of the present invention includes a compiler program for making a computer optimize a program to be optimized by changing the order of execution of instructions in the program. The compiler program making the computer function as a dummy instruction generation section which is used when change of the instruction execution order is restricted, and which generates a dummy instruction not to perform substantial processing, and an execution order control section which performs optimization by changing the instruction execution order while restricting change of the execution order over the dummy instruction.

A fifth exemplary embodiment of the present invention includes an optimization method in which the order of execution of instructions in a program to be optimized is changed. The method includes a step of detecting a first instruction having a possibility to cause an exception; a step of detecting a second instruction executed prior to the first instruction, the second instruction assuring that no exception of the first instruction occurs, and a step of changing the position of the first instruction in execution order so that the first instruction is executed before a conditional branch instruction for selectively executing the first instruction and after the second instruction.

A sixth exemplary embodiment of the present invention includes an optimization method in which a program to be optimized is optimized by changing the order of execution of instructions in the program. The method includes a step used when change of the instruction execution order is restricted to generate a dummy instruction not to perform substantial processing, and a step of performing optimization by changing the instruction execution order while restricting change of the execution order over the dummy instruction.

A seventh exemplary embodiment of the present invention includes a recording medium on which a compiler program for making a computer change the order of instructions in a program to be optimized is recorded. The compiler program making the computer function as an exception occasion instruction detection section which detects a first instruction having a possibility to cause an exception, an assurance instruction detection section which detects a second instruction executed prior to the first instruction, the second instruction assuring that no exception of the first instruction occurs, and an execution order control section which changes the position of the first instruction in execution order so that the first instruction is executed before a conditional branch instruction for selectively executing the first instruction and after the second instruction.

An eighth exemplary embodiment of the present invention includes a recording medium on which a compiler program for making a computer optimize a program to be optimized by changing the order of execution of instructions in the program. The compiler program making the computer function as a dummy instruction generation section which is used when change of the instruction execution order is restricted, and which generates a dummy instruction not to perform substantial processing, and an execution order control section which performs optimization by changing the instruction execution order while restricting change of the execution order over the dummy instruction.

The present invention has been described above using exemplary embodiments. However, the technical scope of the present invention is not limited to that described above. Various changes or modifications may be made in the above-described embodiments According to the present invention, as is apparent from the above description, it is possible to optimize a program by changing the position in execution order of an instruction which as a possibility to cause an exception.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. An optimization apparatus which changes the order of execution of instructions in a program to be optimized, said apparatus comprising:
   an exception occasion instruction detection section which detects a first instruction having a possibility to cause an exception;
   an assurance instruction detection section which detects a second instruction executed prior to the first instruction, the second instruction assuring that no exception of the first instruction occurs; and
   an execution order control section which changes the position of the first instruction in execution order so that the first instruction is executed before a conditional branch instruction for selectively executing the first instruction and after the second instruction.

2. The optimization apparatus of claim 1, further comprising a dummy instruction generation section which generates a dummy instruction, which is an instruction not to perform substantial processing, at such a position that the dummy instruction is executed after the conditional branch instruction and before the first instruction if it is assured by a branch condition in the conditional branch instruction that no exception of the first instruction selectively executed by the conditional branch instruction occurs, wherein said execution order control section restricts change of the execution order so that the first instruction is not placed before the dummy instruction.

3. The optimization apparatus of claim 1, wherein
   said exception occasion instruction detection section detects a memory access information as the first instruction;
   said exception occurs in a case where an address in a memory accessed by the memory access instruction is invalid; and
   said assurance instruction detection section detects as the second instruction an instruction for determination as to whether the address in the memory accessed by the memory access instruction is a valid address.

4. The optimization apparatus of claim 3, wherein
   said exception occasion instruction detection section detects as the first instruction an instruction for reference to an address in the memory designated based on a variable; and
   said assurance instruction detection section detects as the second instruction an instruction for determination as to whether the value of the variable is a null value indicating invalidity.

5. The optimization apparatus of claim 3, wherein
   said exception occasion instruction detection section detects as the first instruction the memory access instruction for access to an array variable stored in the memory; and
   said assurance instruction detection section detects as the second instruction an instruction for determination as to whether a suffix to the array variable accessed by the memory access instruction is within the range corresponding to the size of the array variable.

6. The optimization apparatus of claim 1, wherein the program to be optimized comprises an exception check instruction for detection as to whether an exception of the first instruction occurs, the exception check instruction being executed before the first instruction and after the conditional branch instruction;
   wherein said exception occasion instruction detection section detects the exception check instruction,
   wherein said assurance instruction detection section detects as the second instruction an instruction assuring that no exception of the exception check instruction occurs,
   wherein said apparatus further comprises an instruction removal section which removes the exception check instruction when the second instruction is detected is further provided, and
   wherein said execution order control section changes the execution order so that the first instruction is executed before the conditional branch instruction while maintaining the order of execution of the second instruction, the exception check instruction and the first instruction in a case where the exception check instruction is not removed.

7. The optimization apparatus of claim 1, further comprising a redundancy removal section which removes a redundant instruction which is redundant with another instruction with respect to a processing content in the program to be optimized after the instruction execution order has been changed by said execution order control section.

8. The optimization apparatus of claim 1, further comprising a partial redundancy removal section which further removes a partial redundancy from the program to be optimized after the instruction execution order has been changed by said execution order control section.

9. The optimization apparatus of claim 1, further comprising an in-loop invariant optimization section which performs processing for moving, out of a loop, a memory access instruction for reading the value of invariant in the loop in the program to be optimized after the instruction execution order has been changed by said execution order control section.

10. A computer-readable storage medium storing a compiler program for making a computer change the order of instructions in a program to be optimized, said compiler program comprising:
   instructions for detecting a first instruction having a possibility to cause an exception;
   instructions for detecting a second instruction executed prior to the first instruction, the second instruction assuring that no exception of the first instruction occurs; and
   instructions for changing the position of the first instruction in execution order so that the first instruction is executed before a conditional branch instruction for selectively executing the first instruction and after the second instruction.

11. The computer-readable storage medium of claim 10, wherein
   said instructions for detecting a first instruction comprise instructions for detecting a memory access information as the first instruction;
   said exception occurs in a case where an address in a memory accessed by the memory access instruction is invalid; and said instructions for detecting a second instruction comprise instructions for detecting as the second instruction an instruction for determination as to whether the address in the memory accessed by the memory access instruction is a valid address.

12. The computer-readable storage medium of claim 10, wherein the program to be optimized includes an exception check instruction for detection as to whether an exception of the first instruction occurs, the exception check instruction being executed before the first instruction and after the conditional branch instruction;

wherein said instructions for detecting a first instruction comprises instructions for detecting the exception check instruction;

wherein said instructions for detecting a second instruction comprise instructions for detecting as the second instruction an instruction assuring that no exception of the exception check instruction occurs;

wherein the compiler further comprises instructions for removing the exception check instruction when the second instruction is detected; and wherein said instructions for detecting a first instruction comprises instructions for changing an execution order so that the first instruction is executed before the conditional branch instruction while maintaining the order of execution of the second instruction, the exception check instruction and the first instruction in a case where the exception check instruction is not removed.

13. The computer-readable storage medium of claim 10, further comprising instructions for removing a redundant instruction which is redundant with another instruction with respect to a processing content in the program to be optimized after the instruction execution order has been changed.

14. An optimization method in which the order of execution of instructions in a program to be optimized is changed, said method comprising:

detecting, by a computer, a first instruction having a possibility to cause an exception;

detecting, by the computer, a second instruction executed prior to the first instruction, the second instruction assuring that no exception of the first instruction occurs; and changing, by the computer, the position of the first instruction in execution order so that the first instruction is executed before a conditional branch instruction for selectively executing the first instruction and after the second instruction.

15. A computer-readable storage medium on which a compiler program for making a computer change the order of instructions in a program to be optimized is recorded, said compiler program making the computer function as:

an exception occasion instruction detection section which detects a first instruction having a possibility to cause an exception;

an assurance instruction detection section which detects a second instruction executed prior to the first instruction, the second instruction assuring that no exception of the first instruction occurs; and an execution order control section which changes the position of the first instruction in execution order so that the first instruction is executed before a conditional branch instruction for selectively executing the first instruction and after the second instruction.

* * * * *